United States Patent
Hasegawa et al.

(10) Patent No.: US 7,900,219 B2
(45) Date of Patent: Mar. 1, 2011

(54) DISC DEVICE HAVING IMPROVED SUPPRESSION OF DISC MOVEMENT

(75) Inventors: Kazunori Hasegawa, Kanagawa (JP); Tsukasa Nakayama, Kanagawa (JP); Hiroto Nishida, Ishikawa (JP); Isamu Nakade, Ishikawa (JP); Kenji Urushihara, Kanagawa (JP)

(73) Assignee: Panasonic Corporation, Osaka (JP)

( * ) Notice: Subject to any disclaimer, the term of this patent is extended or adjusted under 35 U.S.C. 154(b) by 869 days.

(21) Appl. No.: 11/814,212

(22) PCT Filed: Jan. 18, 2006

(86) PCT No.: PCT/JP2006/300636
§ 371 (c)(1),
(2), (4) Date: Jul. 18, 2007

(87) PCT Pub. No.: WO2006/077880
PCT Pub. Date: Jul. 27, 2006

(65) Prior Publication Data
US 2009/0055847 A1   Feb. 26, 2009

(30) Foreign Application Priority Data
Jan. 19, 2005 (JP) .............................. 2005-011829

(51) Int. Cl.
*G11B 17/04* (2006.01)
(52) U.S. Cl. ...................................... 720/614
(58) Field of Classification Search ................. 720/614
See application file for complete search history.

(56) References Cited

U.S. PATENT DOCUMENTS

| 4,802,049 | A | 1/1989 | Tanaka et al. |
| 5,159,585 | A | 10/1992 | Ikedo et al. |
| 5,930,223 | A | 7/1999 | Toyama et al. |
| 6,226,144 | B1 | 5/2001 | Nagl et al. |
| 2002/0172108 | A1 * | 11/2002 | Moreira et al. ........... 369/30.36 |
| 2003/0112718 | A1 | 6/2003 | Otsuki |
| 2008/0077947 | A1 * | 3/2008 | Seki et al. ................... 720/614 |
| 2009/0254928 | A1 * | 10/2009 | Ohmura et al. ............ 720/614 |
| 2010/0088712 | A1 * | 4/2010 | Tokita et al. ................ 720/614 |

FOREIGN PATENT DOCUMENTS

| DE | 197 37 496 A1 | 3/1998 |
| EP | 0 921 523 A1 | 6/1999 |
| EP | 1 014 359 A2 | 6/2000 |

(Continued)

OTHER PUBLICATIONS

International Search Report for Application No. PCT/JP2006/300636, dated Apr. 18, 2006.

*Primary Examiner*—Angel A. Castro
(74) *Attorney, Agent, or Firm*—RatnerPrestia

(57) ABSTRACT

A disc device is capable of suppressing movement of discs remaining on standby. Discs are moved upward and downward, thereby providing an operation space S at a lower side of the desired disc, and a pivotal arm is located in a predetermined position, and thereafter the desired disc is set on the pivotal arm, and recording/reproduction is effected. At this time, the standby discs disposed at the lower side of the desired disc are disposed below the operation space (S), and are fixed by pressing pressing members of disc fixing portions against outer peripheral surfaces thereof.

6 Claims, 11 Drawing Sheets

FOREIGN PATENT DOCUMENTS

| | | |
|---|---|---|
| EP | 1 308 948 A2 | 5/2003 |
| EP | 1308948 A2 | 5/2003 |
| EP | 1 783 764 A1 | 5/2007 |
| EP | 06 71 1905 | 2/2009 |
| JP | 04-103346 | 9/1992 |
| JP | 07-326112 A | 12/1995 |
| JP | 11-045490 | 2/1999 |
| JP | 2001-035060 A | 2/2001 |
| JP | 2002-343011 A | 11/2002 |
| JP | 2003-141809 A | 5/2003 |
| JP | 3553425 B2 | 8/2004 |

\* cited by examiner (A)

(B)

DISC DEVICE HAVING IMPROVED SUPPRESSION OF DISC MOVEMENT

This application is a U.S. national phase application of PCT international application PCT/JP2006/200636.

TECHNICAL FIELD

This invention relates to a disc device provided with a plurality of trays on which discs can be placed respectively and which are arranged in a stack.

BACKGROUND ART

There have been developed multi-play type disc devices in which a plurality of discs such as optical discs are stored within a body of the device, and a desired disc is selected, and is subjected to recording/reproduction (see, for example, Patent Literatures 1 and 2).

In such a multi-loading type disc device, when the desired disc is selected, an operation space for the purpose of effecting the recording/reproduction relative to this disc is formed. Then, in order to insert a turntable for rotating the disc and an optical pickup for effecting the recording/reproduction into the operation space, a pivotal arm provided with the turntable and the optical pickup is pivotally moved, and is inserted into the operation space.

At this time, the discs other than the disc for effecting the recording/reproduction are placed on the respective trays, and are sometimes moved on the respective trays by vibrations. This movement on the tray generates noises, and affects the recording/reproducing operation of the disc in the process of recording/reproduction, and besides there is a possibility that a scratch develops on a recording/reproduction surface of the disc during the movement.

Patent Literature 1: JP-A-11-45490
Patent Literature 2: JP-A-2001-35060

DISCLOSURE OF THE INVENTION

Problem that the Invention is to Solve

The present invention has been made in view of the above circumstances, and an object of the invention is to provide a disc device capable of suppressing the movement of discs remaining on standby.

Means for Solving the Problem

A disc device of the present invention is provided with a plurality of trays on which discs can be placed respectively and which are arranged in a stack, and the disc device includes a tray moving portion that moves the trays in a stacking direction, and a disc fixing portion that fixes the standby discs standing by at least one of an upper side and a lower side in the stacking direction. The disc fixing portion includes a pressing member which presses outer peripheral surfaces of the standby discs.

With this construction, when the desired disc is set on a pivotal arm, and the recording/reproduction is to be effected, the standby discs are fixed by pressing the pressing member of the disc fixing portion against the outer peripheral surfaces thereof, and therefore the movement of the standby discs is suppressed. Therefore, the vibration of the standby discs can be prevented, and the generation of noises due to vibrations of the standby discs can be prevented, and besides an error in recording/reproduction operation can be prevented.

Furthermore, in the disc device of the present invention, the pressing member is a cantilever spring made of a resin.

With this construction, the resin spring is used as the spring for pressing the pressing member against the outer peripheral surfaces of the discs, and therefore the pressing member can be formed in an integral manner, and a simplified design of the apparatus can be achieved.

Furthermore, the disc device of the present invention includes a disc holding portion which holds the disc placed on the tray moved into a predetermined position in the stacking direction, and also forms an operation space for the purpose of effecting operations for effecting recording or reproduction of the disc, and the disc holding portion includes a rotary portion of a generally cylindrical shape which has a first cam groove at its outer peripheral surface and is rotatable, an upper holder which is provided on the outside of the rotary portion, and can rotate and move upward and downward, following the first cam groove through a cam projection formed on its inner peripheral surface, and has at its outer peripheral surface a second cam groove and an upper holder portion for abutting against the disc, a lower holder which is disposed at a lower side of the upper holder, and can rotate and move upward and downward, following the first cam groove through a cam projection formed on its inner peripheral surface, and has at its outer peripheral surface a third cam groove and a lower holder portion for abutting against the disc, and a fixed member which is fixed to a box body of the disc device, and has two cam projections engaged respectively in the second cam groove and the third cam groove, and the pressing member is provided at the outer periphery of at least one of the lower holder and the upper holder.

With this construction, the disc fixing portion does not need to be provided for exclusive use, and the simplified design of the apparatus can be achieved.

In the disc device of the present invention, the pressing member presses an outer peripheral portion of the tray.

With this construction, the vibration of the tray having the disc placed thereon can also be suppressed.

The disc device of the present invention further includes a retaining hole fixing portion for fixing retaining holes of the standby discs.

With this construction, when the desired disc is set on the pivotal arm, and the recording/reproduction is to be effected, the retaining holes of the standby discs are fixed by the retaining holes fixing portion, and therefore the movement of the standby discs can be more positively suppressed.

In the disc device of the present invention, the retaining hole fixing portion includes a pillar body which can pass through the retaining holes of the discs, and a fixing member which can project from an outer peripheral surface of the pillar body to be press-contacted with inner peripheral surfaces of the retaining holes.

With this construction, the pillar body of the retaining holes fixing portion is passed through the retaining holes of the standby discs disposed below the operation space, and the fixing member is projected to be press-contacted with the inner peripheral surfaces of the retaining holes, and by doing so, the standby discs can be positively fixed.

Advantage of the Invention

As is clear from the foregoing description, according to the present invention, there can be provided the disc device capable of suppressing the movement of the discs remaining on standby.

Figure 1:
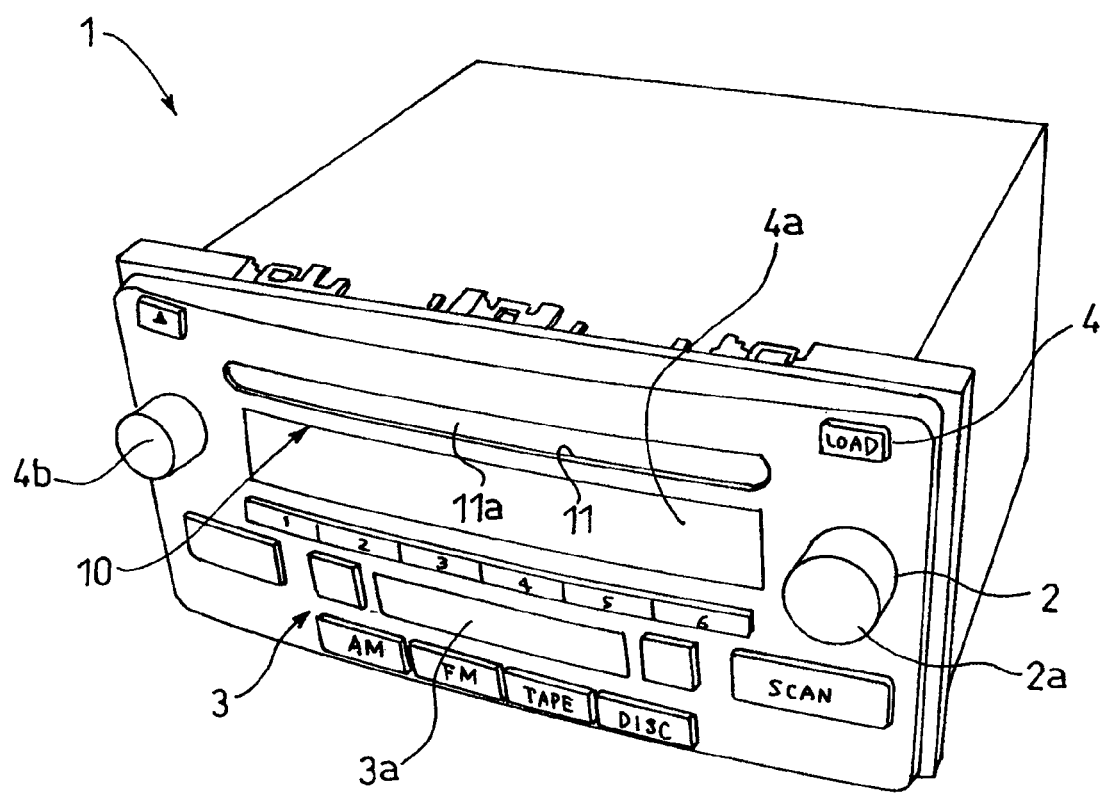
FIG. 1 is a perspective view of the whole of a car audio apparatus containing a disc device according to an embodiment of the present invention.

DESCRIPTION OF THE REFERENCE NUMERALS 10 disc device
12 disc
20 tray
30 pivotal arm
32 optical head portion
40 retaining hole fixing portion
43 wedge-shaped member (fixing member)
50 elevator cam gear (cam member for raising and lowering purposes)
54 cam groove
60 disc holding portion
61 rotating portion
61a outer peripheral surface
62 first cam groove
63 upper holder
63a outer peripheral surface
63b upper holder projection (upper holder portion)
63c upper cam projection (cam projection)
64 second cam groove
65 lower holder
65a outer peripheral surface
65b lower holder projection (lower holder portion)
65c lower cam projection (cam projection)
66 third cam groove
67 fixed guide (fixed member)
67a upper cam projection (cam projection)
67b lower cam projection (cam projection)
70 disc fixing portion
71 pressing member
80 support device
81 support plate
82 raising/lowering member

BEST MODE FOR CARRYING OUT THE INVENTION

An embodiment of the present invention will hereafter be described using the drawings.

FIG. 1 is a perspective view showing the whole of a car audio apparatus 1 containing an embodiment of a disc device 10 of the present invention. This car audio apparatus 1 contains a radio 2, a cassette tape reproducing apparatus 3, etc., in addition to the disc device 10, and in addition to a display portion 4a and a power/volume dial 4b which are used in common for all functions, a disc insertion/removal port 11 for the disc device 10, and a tuning dial 2a for the radio, a cassette tape insertion port 3a, etc., are provided at a front panel 4. Also, a control portion (not shown) for controlling the radio 2, the cassette tape reproducing apparatus 3, the disc device 10, etc., are provided in the interior.

Figure 2:
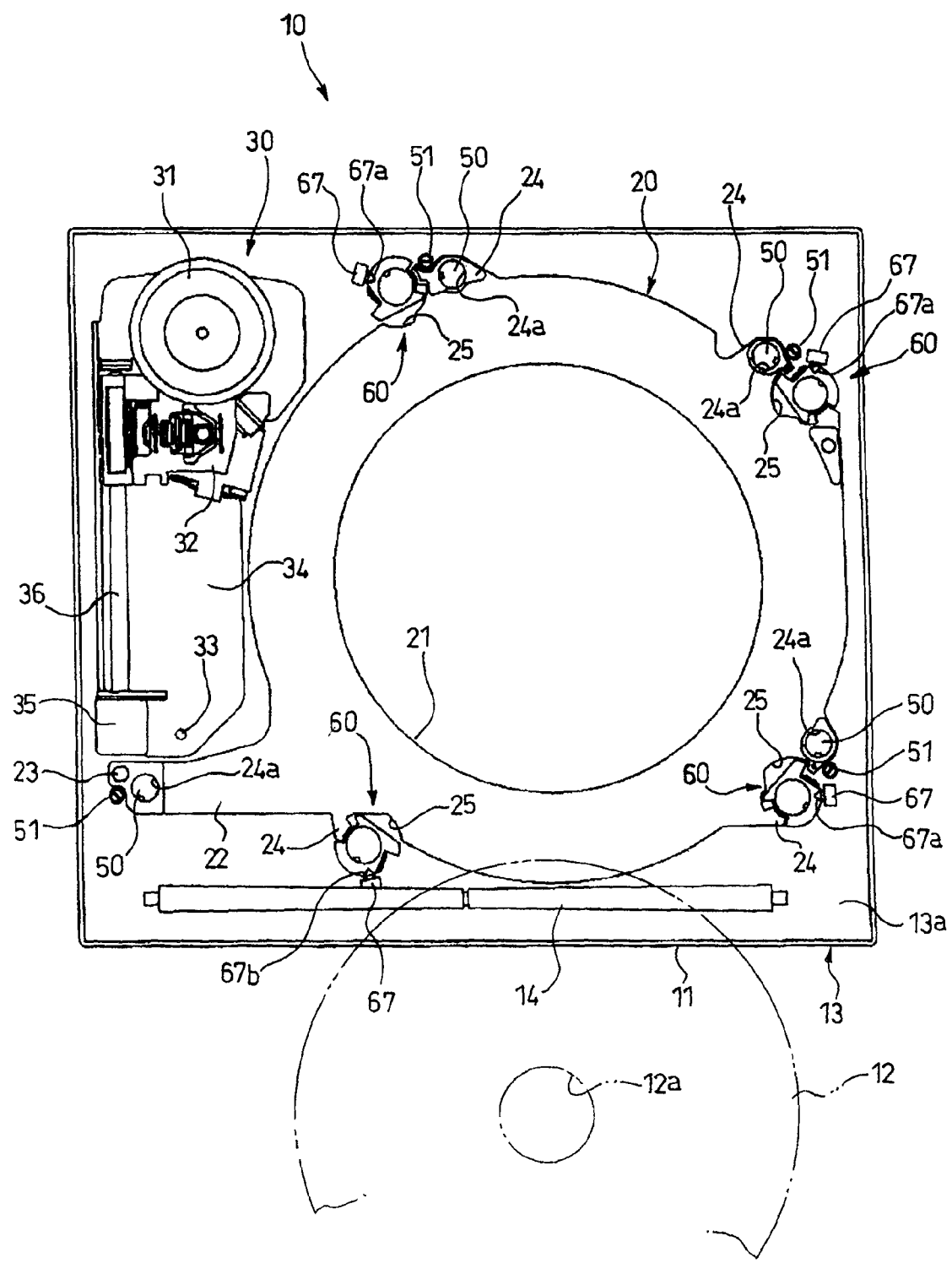
FIG. 2 is a top plan view of an important portion of the disc device according to the embodiment of the present invention in a standby condition.
Figure 3:
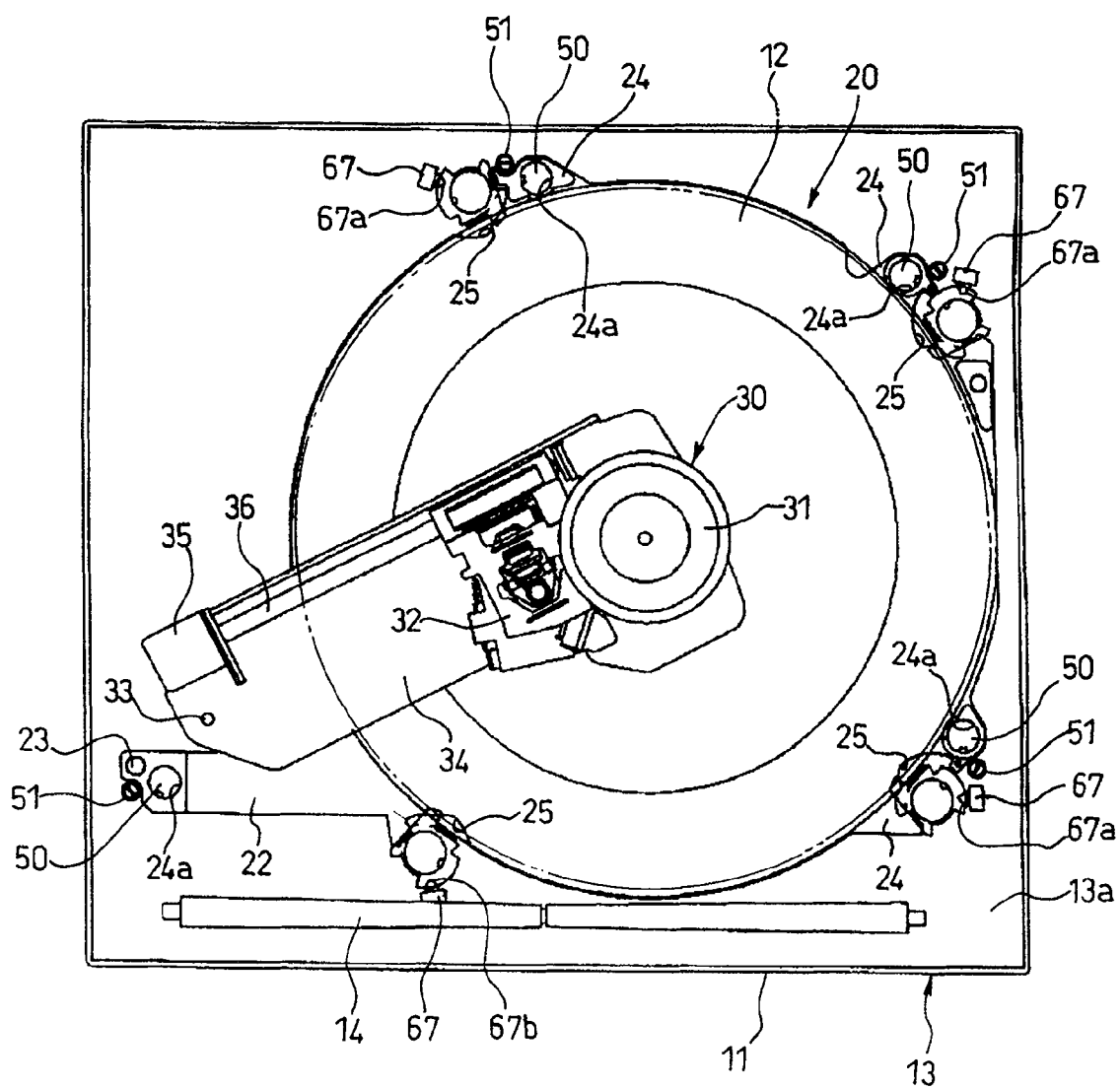
FIG. 3 is a top plan view of the important portion of the disc device according to the embodiment of the present invention during reproduction.

FIGS. 2 and 3 are a top plan view of an important portion of the disc device 10 contained in the car audio apparatus 1, and FIG. 2 shows a standby condition, and FIG. 3 shows a reproducing condition.

As shown in FIG. 2, the embodiment of the disc device 10 of the present invention includes a body 13 capable of storing a plurality of discs 12 therein, a plurality of stacked trays 20 for respectively holding the discs 12 within the body 13, and a pivotal arm 30 which has at its distal end a turntable 31 rotatable while gripping the disc 12, and supports an optical head portion 32 for effecting recording/reproduction relative to the disc 12 in a manner to enable movement of the optical head portion, and can be pivotally moved about a support shaft 33 parallel to a direction of stacking of the trays 20. Further, as will be more specifically described later, there are provided disc fixing portions (omitted in FIG. 2 and FIG. 3) which fix the standby discs, standing by on the trays 20, during the time when the recording or the reproduction of the selected disc is effected.

As shown in FIG. 2 and FIG. 3, the tray 20 has a generally disc-shape as a whole, and has a round hollow portion 21 formed in a central portion thereof. Therefore, the tray 20 has a closed circle-shape, and can retain rigidity. Also, part of the tray 20 projects outwardly to form a support portion 22, and the trays are supported by a shaft portion 23 in such a manner that they can be moved upward and downward independently.

Larger-width portions 24 are formed respectively at a plurality of portions of an outer peripheral edge of the tray 20, and an elevation-purpose through hole 24a is formed through this larger-width portion 24. There are provided tray raising and lowering-purpose elevator cam gears 50 (serving as raising and lowering-purpose cam members) which extend through the elevation-purpose through holes 24a in the upward-downward direction. At outer sides of the larger-width portions 24, springs 51 (see FIG. 9(C)) for urging all of the trays 20 in a direction to bring them into contact with one another are provided to extend between the uppermost tray 20a and a bottom portion 13a of the body 13. Incidentally, the uppermost tray 20a is provided not for the placing of the disc 12 thereon but for protecting the uppermost disc 12. Further, spacers 26 (see FIG. 8) for keeping a space between the trays 20 constant are provided on each tray 20.

Holder portions 60 are provided near respectively to the elevator gears 50 provided at the trays 20, and these holder portions select the desired disc 12 to be subjected to recording/reproduction from the upwardly and downwardly-moving discs 12, and hold this disc, and also form an operation space S (which is a space in which various operations for effecting the recording and reproduction are carried out), and locate the disc in a predetermined position in the operation space S. Further, disc grasping-purpose notches 25 are formed in the tray 20 in corresponding relation to the disc holding portions 60, and at the disc grasping-purpose notches 25, the disc 12 stored on the tray 20 is exposed, and therefore the disc 12 can be easily selected. Although the elevator cam gears 50, as well as the springs 51 and the disc holding portions 60, are provided at four regions of the circumference of the trays 20 at generally equal intervals, the number of these regions is not limited to four in so far as a plurality of regions are provided.

As shown in FIGS. 2 and 3, the pivotal arm 30 which has at its distal end the turntable 31 rotatable while gripping the disc 12 is provided in the vicinity (at the left side in FIG. 2) of the trays 20 within the body 13, and is disposed at a predetermined height in such a manner that the pivotal arm can be pivotally moved about the support shaft 33. The optical head portion 32 is provided on a suspension chassis 34 of the pivotal arm 30 in such a manner that it can reciprocally move along a direction connecting the centers of the support shaft 33 and turntable 30. The optical head portion 32 is engaged with a lead screw 36 rotated by a drive motor 35, and is moved by rotation of the lead screw 36.

Paired upper and lower conveying rollers 14 are provided within the body 13 at the insertion/removal portion 11, and can be rotated in normal and reverse directions by a drive mechanism not shown. With this arrangement, the disc 12 inserted into the insertion/removal port 11 is conveyed, and the disc 12 which has finished the recording/reproduction is discharged from the insertion/removal port 11.

Figure 4:
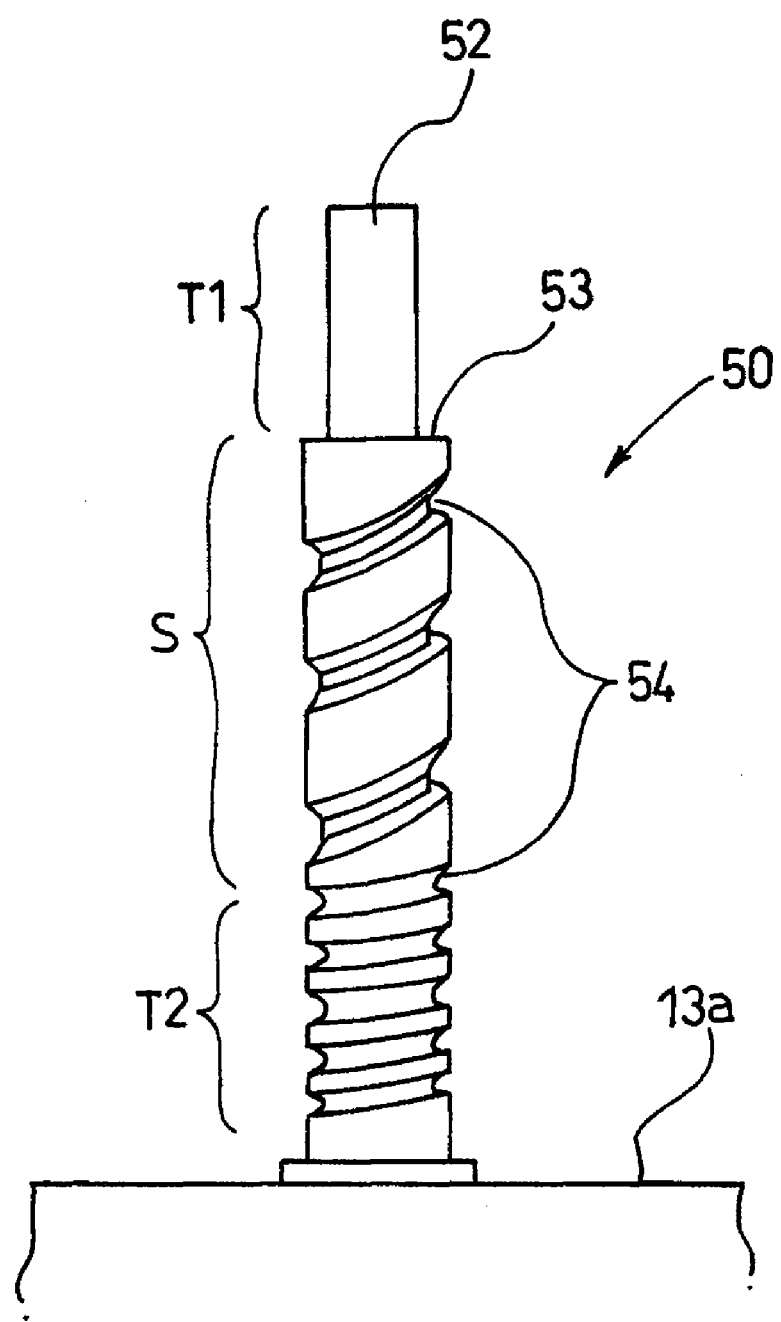
FIG. 4 is a front-elevational view of an elevator cam gear of the disc device according to the embodiment of the present invention.

The elevator cam gear 50 is shown in FIG. 4. As shown in FIG. 4, the elevator cam gear 50 includes three portions. The uppermost portion is formed into a shaft portion 52 of a smaller outer diameter, and this portion corresponds to an upper standby position T1 where the discs 12 stand by at a level higher than the disc 12 to be subjected to the recording/reproduction. The trays 20 standing by here are free to move upward and downward, and are contacted with each other through the spacers 26 by urging forces of the springs 51 (see FIG. 9(C)).

A cam groove 54 in which the trays 20 can be engaged is formed in an outer peripheral surface of a lower portion of the elevator cam gear 50, and forms an upper cam portion 53a and a lower cam portion 53b. The pitch of the cam groove 54 of the upper cam portion 53a is coarser as compared with the pitch of the lower cam portion 53b of the cam groove 54. In this portion, the tray 20 is much moved upward and downward by rotation of the elevator cam gear 50. The upper cam portion is disposed at a position corresponding to the operation space S provided so as to prevent interference with the pivotal movement of the pivotal arm 30.

The pitch of the cam groove 54 of the lower cam portion 53b is relatively fine, and this portion corresponds to a lower standby position T2 where the discs 12 stand by at the level lower than the disc 12 to be subjected to the recording/reproduction.

The elevator cam gears 50 are arranged to be engaged respectively in the elevation-purpose through holes 24a of the larger-width portions 24 provided at the plurality of regions of each tray 20, and are driven to be rotated by a drive mechanism not shown. Therefore, the trays 20 each having the disc 12 placed thereon are moved upward and downward in accordance with the rotation of the elevator cam gears 50.

Figure 5:
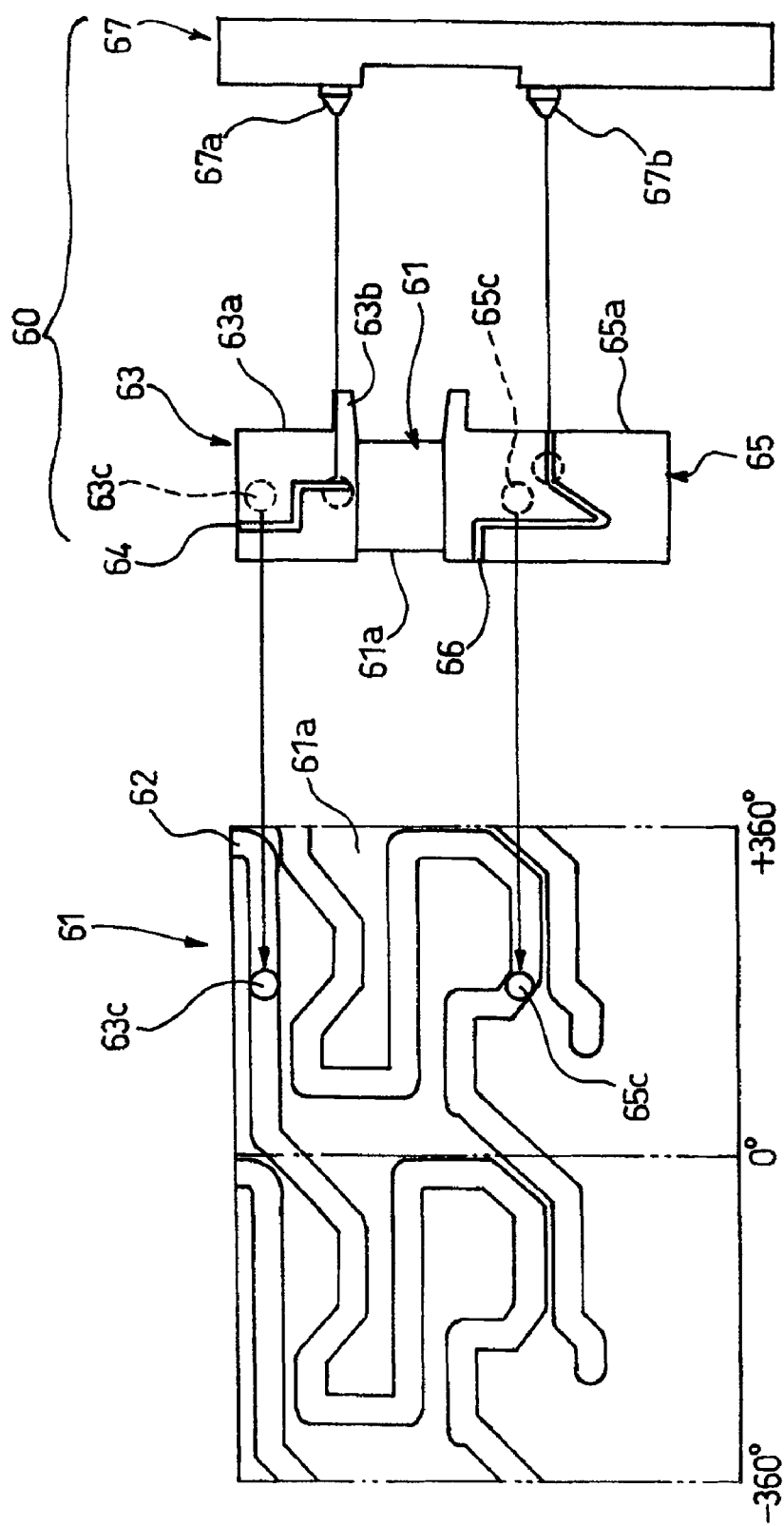
FIG. 5 is an explanatory view (two-circumference developed view) of a disc holding portion of the disc device according to the embodiment of the present invention.

The disc holding portion 60 is shown in FIG. 5. The disc holding portion 60 includes a rotary portion 61 of a generally cylindrical shape rotated by a drive mechanism not shown, an upper holder 63 and a lower holder 65 rotatably and upwardly and downwardly movably supported on the outside of the rotary portion 61, and a fixed guide portion 67 fixed to the body 13 and disposed in the vicinity of the upper holder 63 and the lower holder 65. Although the fixed guide portion 67 is shown in FIG. 5 as disposed at a position spaced from the rotary portion 61, it is actually disposed in proximity to the rotary portion as shown in FIGS. 2, 3, 7, etc.

A first cam groove 62 as shown in a developed view of FIG. 5 is formed in an outer peripheral surface 61a of the rotary portion 61, and a cam projection 63c engaged in the first cam groove 62 is formed on an inner peripheral surface of the upper holder 63. Also, a second cam groove 64 and an upper holder projection 63b (serving as an upper holder portion) for abutting against the disc 12 are provided at an outer peripheral surface 63a of the upper holder 63.

A cam projection 65c engaged in the first cam groove 62 is formed on an inner peripheral surface of the lower holder 65. Also, a third cam groove 66 and a lower holder projection 65b (serving as a lower holder portion) for abutting against the disc 12 are provided at an outer peripheral surface 65a of the lower holder 65.

An upper cam projection 67a (which is a cam projection engaged in the second cam groove 64 of the upper holder 63) and a lower cam projection 67b (which is a cam projection engaged in the third cam groove 66 of the lower holder 65) are formed on the fixed guide portion 67 fixed to the body 13. Incidentally, those fixed guide portions 67 provided near to the disc insertion/removal port 11 are formed only by their lower half portions so as to prevent interference with the disc 12 being inserted and removed.

Therefore, the upper holder 63 and the lower holder 65 are rotated and moved upward and downward in accordance with the rotation of the rotary portion 61.

Figure 6A:
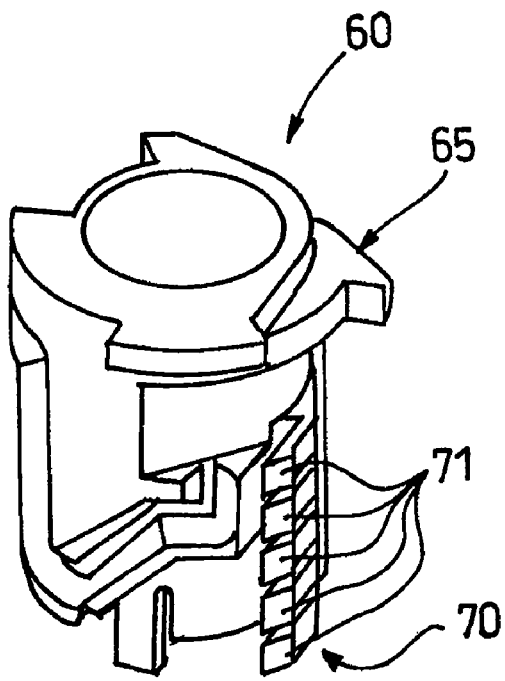
FIG. 6 is perspective views showing a disc fixing portion of the disc device according to the embodiment of the present invention.
Figure 6B:
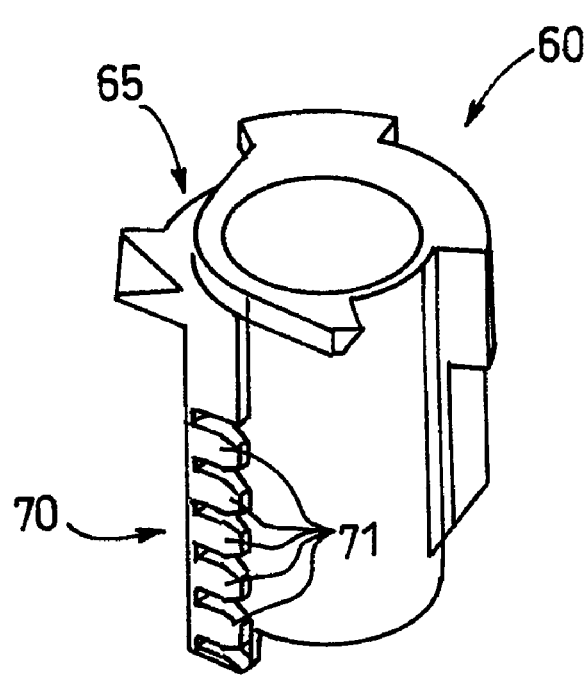
Figure 6C:
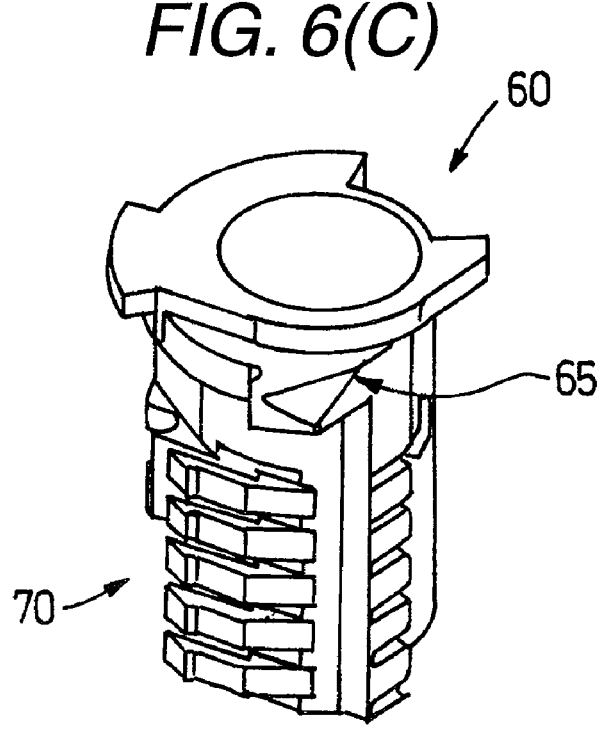
Figure 7A:
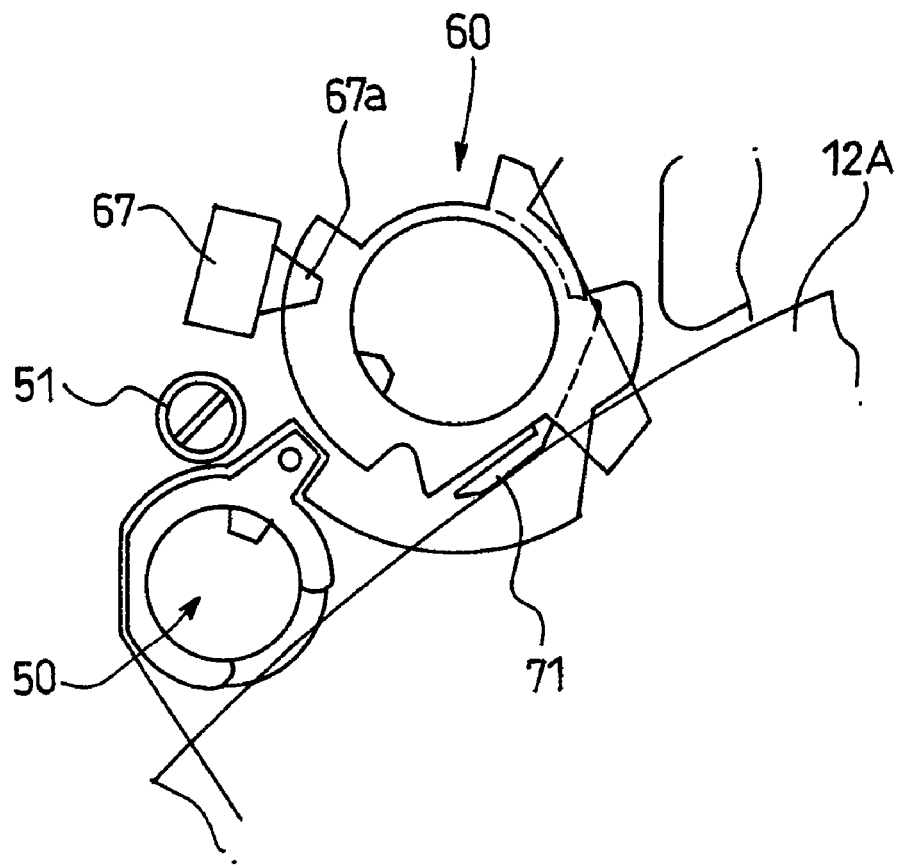
FIG. 7 is views showing a fixed condition of a disc and a condition of a tray of the disc device according to the embodiment of the present invention.
Figure 7B:
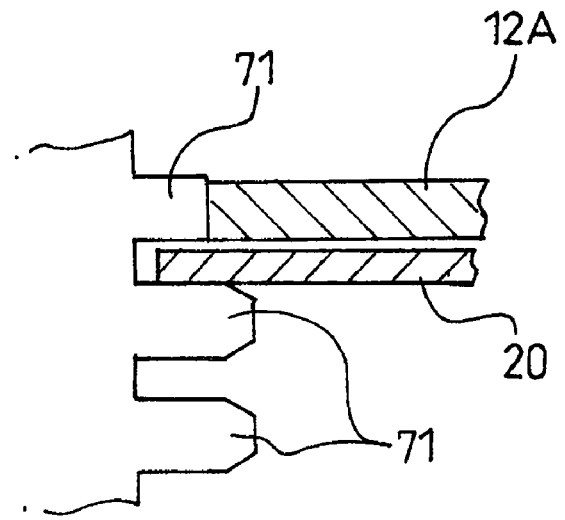

Next, the disc fixing portion will be described. FIGS. 6(A) to (C) are perspective views of the disc fixing portion, FIG. 7(A) is a plan view showing a fixed condition of the disc, and FIG. 7(B) is a cross-sectional view showing the fixed condition of the disc and a condition of the tray.

As shown in FIGS. 6(A) to (C), the disc fixing portion 70 is provided at the side surface of the disc holding portion 60, and is disposed at a position corresponding to the lower standby position T2 (see FIG. 8(A)) where the standby discs 12A disposed at the lower side of the disc 12 to be subjected to the recording/reproduction are stored. Namely, pressing members 71 are provided respectively at those portions of the lower holder 65 corresponding respectively to the outer peripheral surfaces of the standby discs 12A during the recording/reproduction. This pressing member 71 is a cantilever spring made of a resin, and the pressing member, when pressed against the standby disc 12A, is elastically deformed to be pressed against it with a pressing force of such a degree as to suppress the vibration of the standby disc 12A.

For example, in the case where a total of six discs 12 are stored, and the recording/reproduction is selectively effected, there are provided five pressing members 71 so as to correspond to the number (5) of the standby discs 12A stored in the lower standby position T2 at the time when the disc 12 in the uppermost stage is subjected to the recording/reproduction. A distal end of the pressing member 71 projects outwardly from the outer peripheral surface of the lower holder 65, and by rotating the lower holder 65, the pressing member presses the outer peripheral surface of the standby disc 12A with a predetermined resilient force to prevent vibration thereof as shown in FIG. 7(A). Also, as shown in FIG. 7(B), the tray 20 disposed in the lower standby position T2 is held between the adjacent pressing members 71, and therefore vibration of the tray 20 can be prevented.

The operation of the disc device 10 of the above construction will be described using FIGS. 8 and 9. The illustrated example shows the operation in the case of effecting the recording/reproduction of the 4th disc 12 counting up from the bottom. The disc device 10 is capable of placing six discs 12 thereon, and has seven trays 20 including the uppermost tray 20a serving as a lid. The uppermost tray 20a is normally urged downward by the springs 51 connected to the bottom portion 13a of the body 13.

Figure 8:
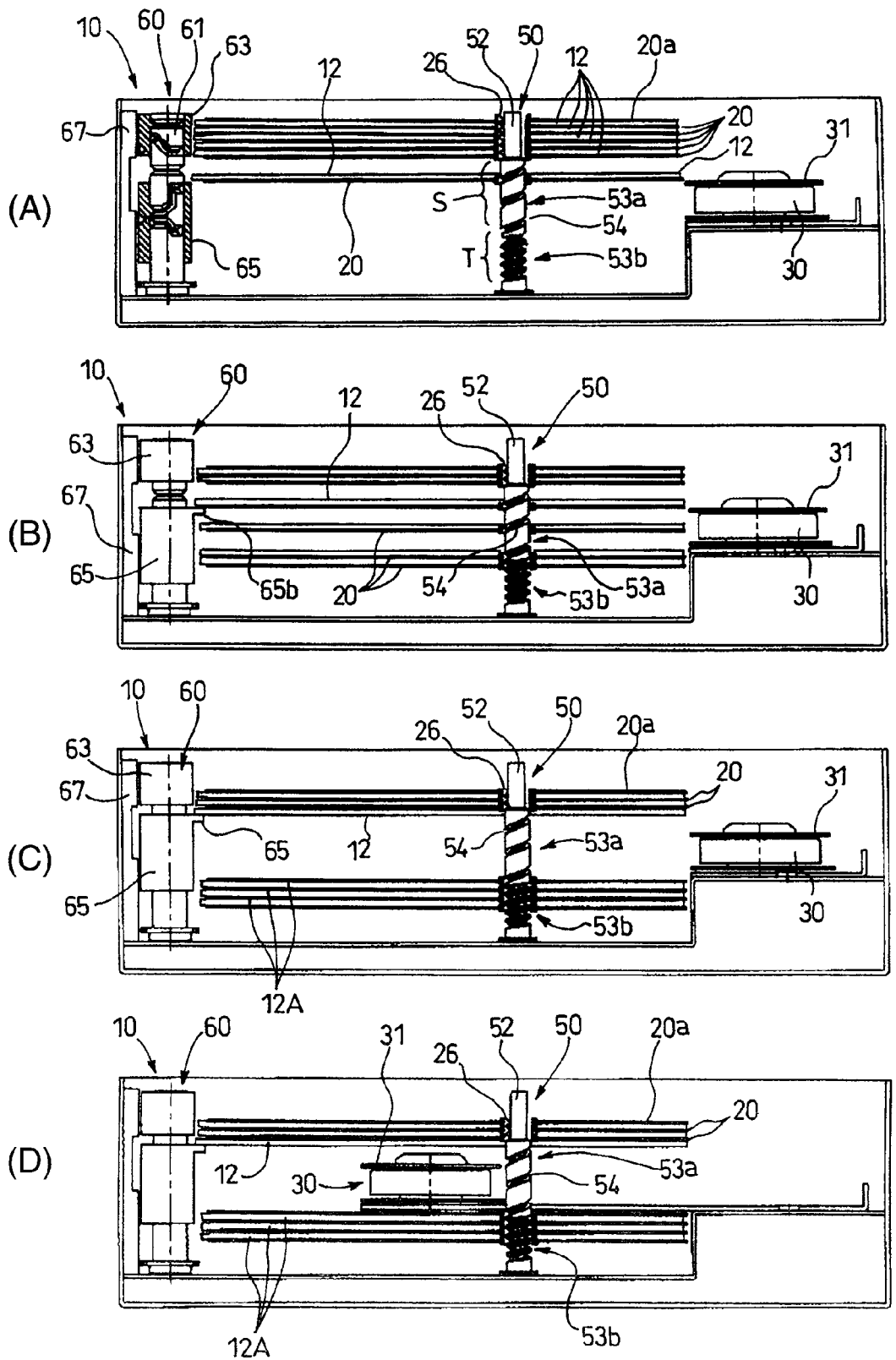
FIG. 8 is views explanatory of the operation of the disc device according to the embodiment of the present invention.
Figure 9:
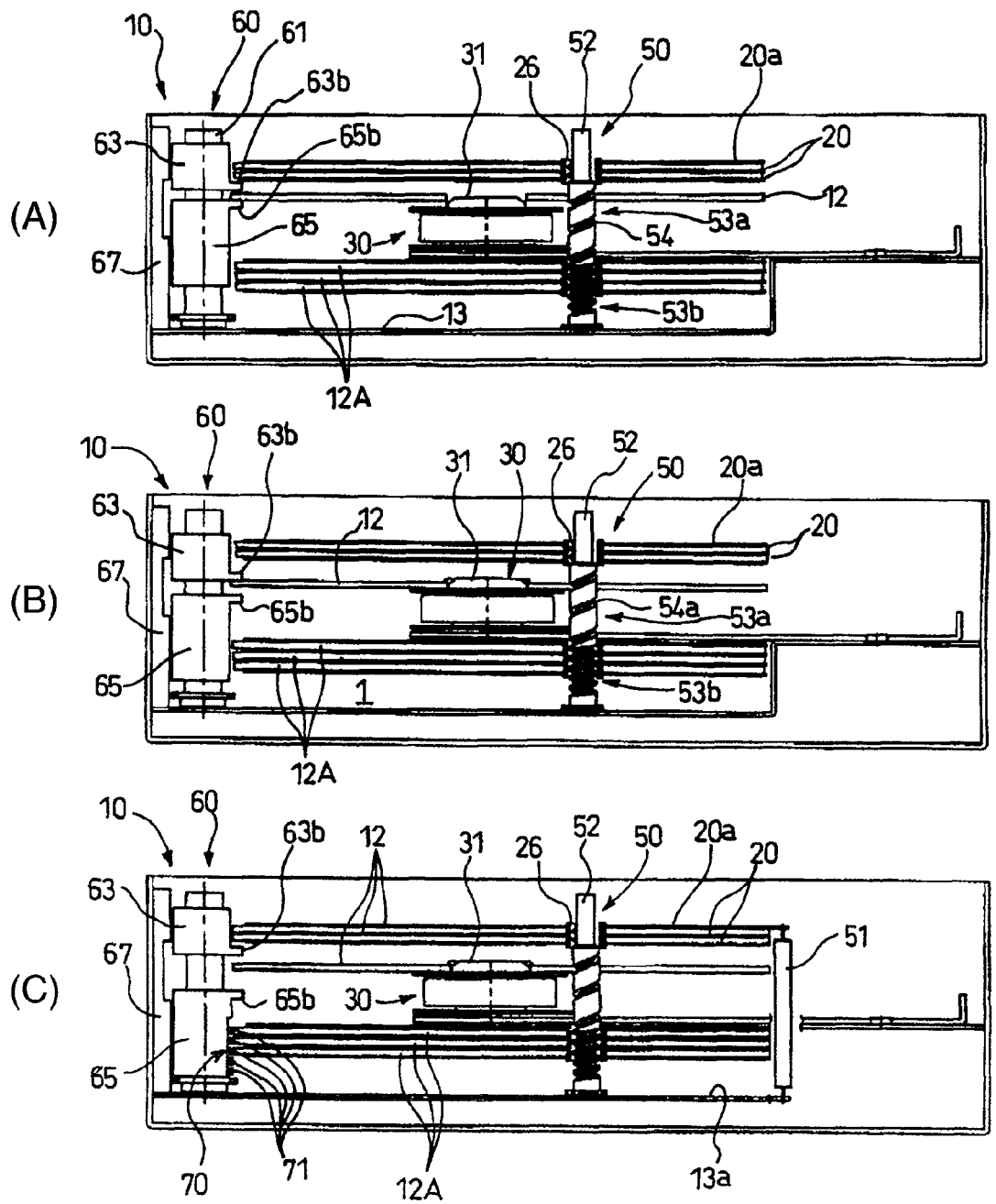
FIG. 9 is views explanatory of the operation of the disc device according to the embodiment of the present invention.

When all of (here, six) the trays 20 each having the disc 12 placed thereon stand by above the operation space S as shown in FIG. 8(A), each tray 20 is urged downward by the springs 51 (not shown in FIG. 8), and therefore the placed discs 12 will not shake. In this condition, when the elevator cam gears 50 are rotated, the lowermost tray 20 become engaged in the cam grooves 54 of the upper cam portions 53a, and descends. At this time, the upper holder 63 and the lower holder 65 of the disc holding portion 60 are positioned such that the upper holder projection 63b and the lower holder projection 65b do not project toward the discs 12. By further rotating the elevator cam gears 50, three trays 20 from the bottom are lowered.

Then, the lower holders 65 are rotated to cause the lower holder projections 65b to project toward the discs 12 as shown in FIG. 8(B), thereby preventing the descending of the disc 12 which is stored on the 4th tray 20 counting up from the bottom and is to be subjected to the recording/reproduction. At this time, as shown in FIG. 8(C), the 4th tray 20 is lowered at high speed by rotation of the elevator cam gears 50, and also the lower holders 65 of the disc holding portions 60 are moved upward to prevent the descending of the 5th tray 20 and the following trays. As a result, the operation space S is formed below the stopped discs 12. In this condition, the pivotal arm 30 is pivotally moved, and is located in a recording/reproduction position as shown in FIG. 8(D).

Then, the upper holders 63 are rotated, thereby preventing the upward and downward movement of the disc 12 to be subjected to the recording/reproduction by the upper holder projections 63b and the lower holder projections 65b as shown in FIG. 9(A), and the holders 63 and 65 are lowered to cause the disc 12 to be placed and set on the turntable 31 as shown in FIG. 9(B). Thereafter, the upper holders 63 are moved upward, and also the lower holders 65 are lowered, thus releasing the disc 12, and further the lower holders 65 are rotated, thereby fixing the standby discs 12A by the pressing members 71 of the disc fixing devices 70, and the recording/reproducing operation is effected. Incidentally, when the discs 12 are to be stored in the upper portion after finishing the recording/reproducing operation, the above-mentioned process is effected in a reversed manner, and by doing so, the discs can be returned into the stored condition as shown in FIG. 8(A).

The above movements of the upper holder 63 and lower holder 65 can be achieved by the cam groove 62 formed in the outer periphery of the rotary portion 61, the upper holder projection 63b and the lower holder projection 65b engaged in the cam groove 62, and the projections 67a and 67b of the fixed guide portion 67 engaged respectively in the second cam groove 64 and the third cam groove 66 formed respectively in the outer peripheries of the upper holder 63 and lower holder 65. And, the number of the discs 12 to be moved downward can be controlled by the amount of rotation of the elevator cam gears 50.

As described above, by moving the trays 20 upward and downward by the elevator cam gears 50, the desired disc 12 is selected by the disc holding portions 60, and the selected disc 12 is placed on the turntable 31, and therefore notches for preventing interference with the pivotal arm 31 do not need to be formed in the trays 20. With this arrangement, the rigidity of the tray 20 can be secured, and therefore the deformation of the tray 20 can be prevented, and besides a compact design can be achieved. Furthermore, the discs standing by above the selected disc are disposed in a stacked condition, and therefore a spatial efficiency is enhanced, and the compact design can be achieved also in this respect.

Furthermore, the pressing members 71 of the disc fixing portions 70 are pressed against the outer peripheral surfaces of the standby discs 12A disposed below the desired disc 12, thereby fixing the standby discs, and therefore the movement of the standby discs 12A can be suppressed at the time of effecting the recording/reproduction of the disc 12.

Incidentally, in the above description, the shaft portion 52, the upper cam portion 53a and the lower cam portion 53b are formed integrally with one another to provide the elevator cam gear 50 which can be rotated as a whole. However, the shaft portion 52 can be provided as a fixed member, and there can be provided an upper cam portion 53a and a lower cam portion 53b which can be driven to be rotated around this shaft portion 52.

Furthermore, the disc fixing portions 70 are provided respectively at the side surfaces of the disc holding portions 60, and correspond in number to the disc holders. However, the disc fixing portion may be provided as a separate member, and also the number of the disc fixing portions is arbitrary. For example, even if one disc fixing portion 70 is provided, the discs can be fixed in case a member for fixing the discs is provided at a region opposed to the disc fixing portion 70 in a diametrical direction of the disc.

Furthermore, in the above description, although the disc fixing portion 70 is provided at the outer periphery of the lower holder 65 of the disc holding portion 60, it may be provided at the outer periphery of the upper holder 63 or may be provided on both. In the case where it is provided at the outer periphery of the upper holder 63, the upper standby discs in the stacking direction are fixed.

Figure 10:
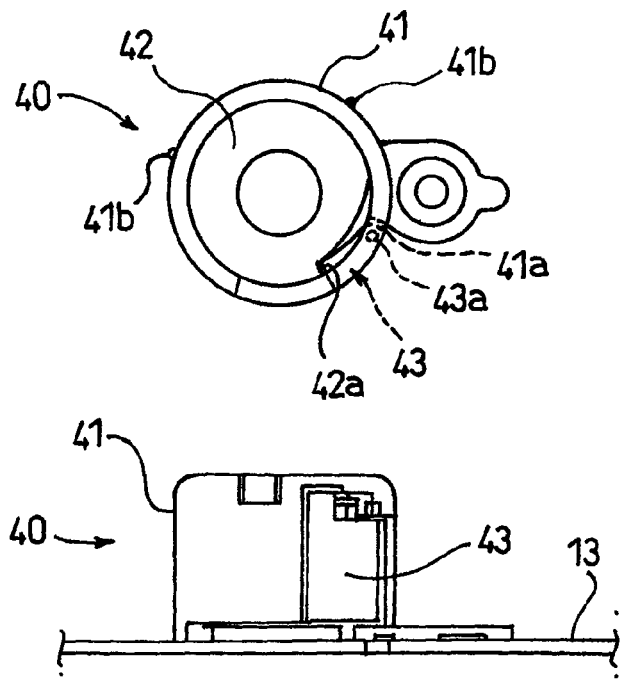
FIG. 10 is a plan view and a front-elevational view showing a retaining hole fixing portion of the disc device according to the embodiment of the present invention in a disc-released condition.
Figure 11:
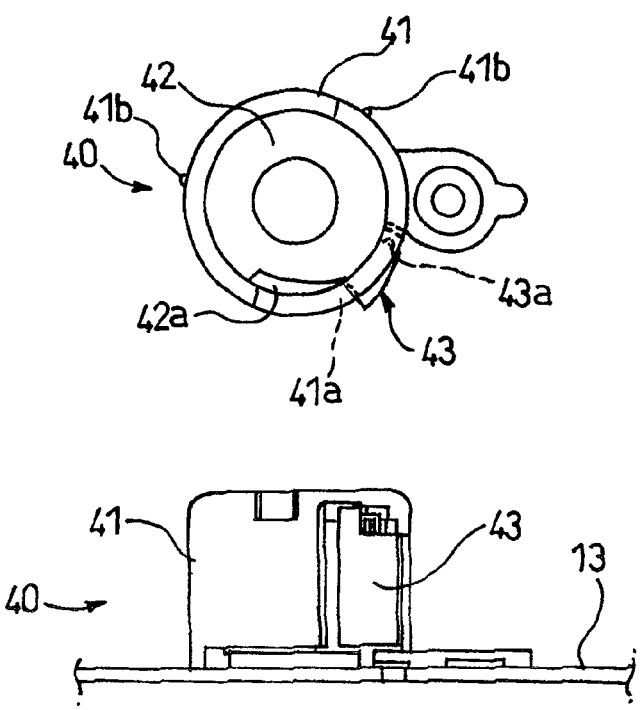
FIG. 11 is a plan view and a front-elevational view showing the retaining hole fixing portion of the disc device according to the embodiment of the present invention in a disc-fixed condition.

Next, a retaining hole fixing portion for fixing retaining holes of the standby discs will be described. The retaining hole fixing portion 40 is shown in FIGS. 10 and 11. As shown in FIG. 10, the retaining hole fixing portion 40 is provided on a central portion (see FIG. 2) of the bottom portion 13a of the body 13, that is, in corresponding relation to the retaining holes 12a of the discs 12 stored in the body 13, and is so sized as to extend through the retaining holes 12a. The disc retaining device 40 has such a height that it is completely received in the standby position T2, and it is formed into a size slightly lower than a bottom surface of the suspension chassis 34 of the pivotal arm 30 so that it will not interfere with the pivotally-moving pivotal arm 30.

The retaining hole fixing portion 40 has a cylindrical fixing portion body 41 having an outer diameter smaller than the inner diameter of the retaining hole 12a of the disc 12, and a notch portion 41a is formed in part of the fixing portion body 41. Convex portions 41 b for preventing the fixing portion body 41 from intimate contact with the retaining hole 12a are provided respectively at a plurality of portions of an outer peripheral surface of the fixing portion body 41. A rotary member 42 which is rotated by a rotation drive mechanism not shown is provided within the fixing portion body 41, and a recess 42a is formed at a position corresponding to the notch portion 41a of the fixing portion body 41. The recess 42a is tapering from the round rotary member 42 in a radius-decreasing direction, and one end is disposed on an outer peripheral surface while the other end portion is much cut inwardly.

The notch portion 41a of the fixing portion body 41 and the recess 42a of the rotary member 42 are disposed respectively at positions corresponding to each other, and a wedge-shaped member 43 extending over the two portions is provided so as to be pivotally moved about a support shaft 43a. This wedge-shaped member 43 is tapering such that its thickness is increasing from its end near to the support shaft 43a toward the other end thereof. Also, the wedge-shaped member 43 is normally urged inwardly by an urging unit not shown, and its outer peripheral surface is generally round so that it will not project at least from the outer peripheral surface of the fixing body portion 41 in a received condition.

Therefore, in the fixed condition of the discs, when the rotary member 42 is rotated in a clockwise direction relative to the fixing portion body 41 as shown in FIG. 11, the outer peripheral surface of the wedge-shaped member 43 projects outwardly from the outer peripheral surface of the fixing portion body 41, and is pressed against the inner peripheral surfaces of the retaining holes 12a of the standby discs 12A. As a result, the vibration of the standby discs 12A can be prevented.

The retaining hole fixing portion 40 may be used in combination with the disc fixing portions 70 or may be used alone. The standby discs at the lower side in the stacking direction are fixed by the retaining hole fixing portion 40, and disc fixing portions 70 are provided at the outer peripheries of the upper holders 63, and by doing so, the standby discs at both sides can be fixed.

Figure 12:
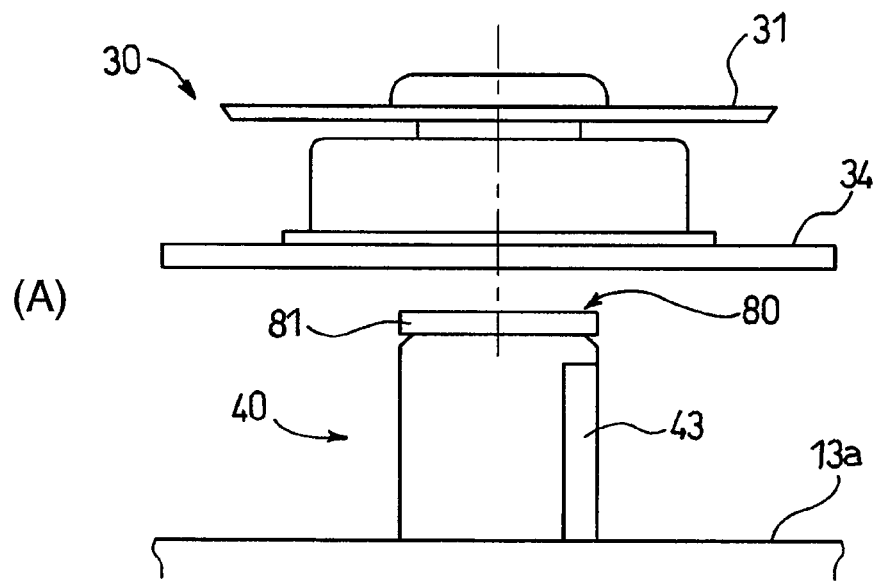
FIG. 12 is cross-sectional views of a pivotal arm support device combined with a retaining hole fixing portion of the disc device according to the embodiment of the present invention.
Figure 12:
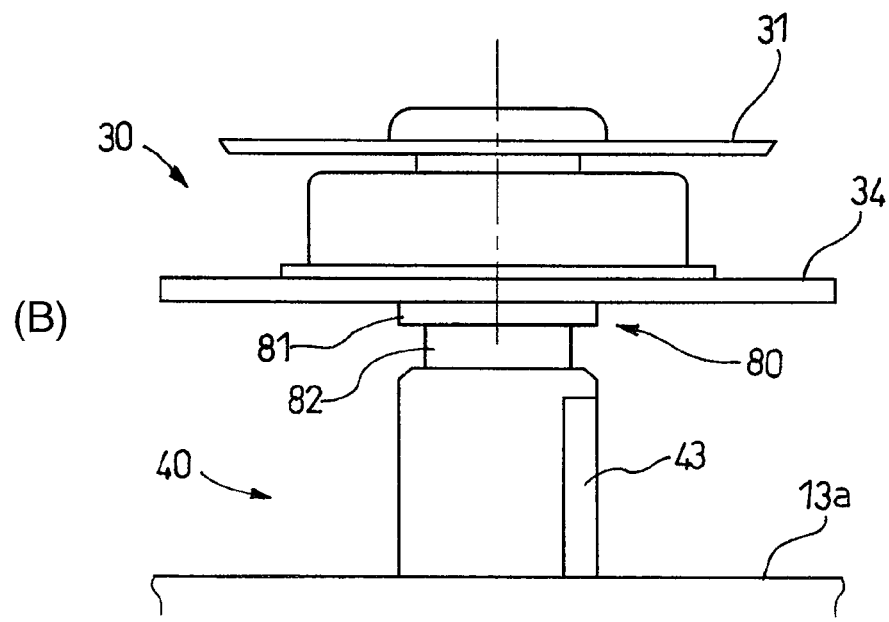

Incidentally, in the above description, although the retaining hole fixing portion 40 has been described as being for exclusive use, it can be combined with a support device for supporting the distal end portion of the pivotal arm 30. A retaining hole fixing portion combined with the support device is shown in FIG. 12. As shown in FIGS. 12(A) and (B), at the time of effecting the recording/reproduction, the support device 80 extends upward from a lower side to support the distal end portion of the pivotal arm 30. In this case, the support device 80 is provided at the same position as the above-mentioned retaining hole fixing portion 40, and therefore the support device 80 can be provided at a central portion of the retaining hole fixing portion 40. Namely, an arrangement is made such that a support plate 81 having an outer diameter smaller than the inner diameter of the retaining hole 12a of the disc 12 can be lifted by an elevation member 82. With this arrangement, the vibration of the pivotal arm 30 is prevented during the recording/reproduction, so that the normal recording/reproduction can be positively effected.

Although the present invention has been described in detail with reference to the specific embodiment, it is apparent to those skilled in the art that various changes and modifications can be added without departing from the spirits and scope of the present invention.

The present Application is based on Japanese Patent Application, Application No. 2005-011829, filed on Jan. 19, 2005, and contents thereof are incorporated herein as reference.

INDUSTRIAL APPLICABILITY

As described above, the disc device of the present invention is useful as a multi-play type disc device or the like in which the movement of the standby discs can be suppressed by utilizing the pressing members pressing the outer peripheral surfaces of the standby discs, and the generation of noises and the occurrence of an error in recording/reproduction operation, etc., can be prevented.

The invention claimed is:

1. A disc device provided with a plurality of trays on which discs can be placed respectively and which are arranged in a stack; comprising:
   a tray moving portion that moves the trays in a stacking direction; and
   a disc fixing portion that fixes the standby discs standing by at at least one of an upper side and a lower side in the stacking direction,
   wherein the disc fixing portion includes a pressing member which presses outer peripheral surfaces of the standby discs.

2. The disc device according to claim 1, wherein the pressing member is a cantilever spring made of a resin.

3. The disc device according to claim 1, further comprising:
   a disc holding portion that holds the disc placed on the tray moved into a predetermined position in the stacking direction, and forms an operation space for the effecting operations of recording or reproduction of the disc,
   wherein the disc holding portion includes:
   a rotary portion having a generally cylindrical shape which has a first cam groove at its outer peripheral surface and is rotatable;
   an upper holder which is provided on the outside of the rotary portion, and can rotate and move upward and downward in accordance with the first cam groove through a cam projection formed on its inner peripheral surface, and has a second cam groove and an upper holder portion for abutting against the disc at its outer peripheral surface;
   a lower holder which is disposed at a lower side of the upper holder, and can rotate and move upward and downward in accordance with the first cam groove through a cam projection formed on its inner peripheral surface, and has a third cam groove and a lower holder portion for abutting against the disc at its outer peripheral surface; and
   a fixed member which is fixed to a box body of the disc device, and has two cam projections engaged to the second cam groove and the third cam groove respectively; and
   wherein the pressing member is provided at the outer periphery of at least one of the lower holder and the upper holder.

4. The disc device according to claim 1, wherein the pressing member presses an outer peripheral portion of the tray.

5. The disc device according to claim 1, further comprising a retaining hole fixing portion that fixes retaining holes of the standby discs.

6. The disc device according to claim 5, wherein the retaining hole fixing portion includes a pillar body which can pass through the retaining holes of the discs, and a fixing member which projects from an outer peripheral surface of the pillar body to be press-contacted with inner peripheral surfaces of the retaining holes.

* * * * *